(12) United States Patent
Diao et al.

(10) Patent No.: US 8,347,289 B2
(45) Date of Patent: Jan. 1, 2013

(54) METHOD AND APPARATUS FOR ONLINE SAMPLE INTERVAL DETERMINATION

(75) Inventors: Yixin Diao, White Plains, NY (US); Joseph L. Hellerstein, Ossining, NY (US); Sam Sampson Lightstone, Toronto (CA); Adam J. Storm, Toronto (CA); Maheswaran Surendra, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 1220 days.

(21) Appl. No.: 12/165,009

(22) Filed: Jun. 30, 2008

(65) Prior Publication Data

US 2008/0263563 A1 Oct. 23, 2008

Related U.S. Application Data

(63) Continuation of application No. 10/853,835, filed on May 26, 2004, now abandoned.

(51) Int. Cl.
*G06F 9/46* (2006.01)
*G06F 17/18* (2006.01)
*G21C 17/00* (2006.01)

(52) U.S. Cl. ........ 718/100; 718/102; 718/104; 702/179; 702/182

(58) Field of Classification Search .................. None
See application file for complete search history.

(56) References Cited

U.S. PATENT DOCUMENTS

| | | | |
|---|---|---|---|
| 5,664,106 A | 9/1997 | Caccavale | |
| 5,732,240 A | 3/1998 | Caccavale | |
| 5,742,819 A | 4/1998 | Caccavale | |
| 5,819,033 A | 10/1998 | Caccavale | |
| 6,470,464 B2* | 10/2002 | Bertram et al. | 714/37 |
| 6,836,800 B1 | 12/2004 | Sweet et al. | |
| 7,155,459 B2 | 12/2006 | Chaudhuri et al. | |
| 7,207,043 B2 | 4/2007 | Blythe et al. | |
| 2003/0005024 A1* | 1/2003 | Grumann | 709/102 |
| 2003/0229462 A1 | 12/2003 | Wang | |
| 2008/0263563 A1 | 10/2008 | Diao et al. | |

OTHER PUBLICATIONS

Reiner et al, "A method for adaptive performance improvement of operating system", ACM, 1981, pp. 2-10.*
Diao et al., "Managing server performance autotune agents", IBM, 2003, pp. 136-149.*
Diao et al. "Generic Online Optimization of multiple configuration parameters with application to a database server", IBM, 2003, pp. 3-15.*
Liu et al., "Online response time optimization of apache web server", Springer-verlag, 2003, pp. 461-478.*
Chung, et al., "Goal oriented dynamic buffer pool management for data base systems", IEEE, 1995, pp. 191-198.
Jay L. Devore, "Probability and statistics for engineering and the sciences", book, Thomas learning, 2000, pp. 156-157, 276-285, 304-307 and 366-371.

* cited by examiner

*Primary Examiner* — Jennifer To
*Assistant Examiner* — Caroline H Arcos
(74) *Attorney, Agent, or Firm* — Louis J. Percello

(57) ABSTRACT

In one embodiment, functional system elements are added to an autonomic manager to enable automatic online sample interval selection. In another embodiment, a method for determining the sample interval by continually characterizing the system workload behavior includes monitoring the system data and analyzing the degree to which the workload is stationary. This makes the online optimization method less sensitive to system noise and capable of being adapted to handle different workloads. The effectiveness of the autonomic optimizer is thereby improved, making it easier to manage a wide range of systems.

39 Claims, 8 Drawing Sheets

METHOD AND APPARATUS FOR ONLINE SAMPLE INTERVAL DETERMINATION

CROSS REFERENCE TO RELATED APPLICATIONS

This application is a continuation of U.S. patent application Ser. No. 10/853,835, filed May 26, 2004, now abandoned entitled "METHOD AND APPARATUS FOR ONLINE SAMPLE INTERVAL DETERMINATION", which is herein incorporated by reference in its entirety.

BACKGROUND

The present invention relates generally to computing systems, and relates more particularly to performance and systems management of computing systems. Specifically, the invention is a method and apparatus for online determination of sample intervals for optimization and control operations in a dynamic, on-demand computing environment.

FIG. 1 is a block diagram illustrating a typical data processing system 10. The data processing system 10 comprises a database server 100 which serves one or more database clients 150. The database server 100 includes a plurality of memory pools 121-125 that is adapted to cache data in a plurality of storage media 111-119. Database agents 101-109 access copies of storage media data through the memory pools 121 to 125 in order to serve the clients 150.

Central to the performance of the data processing system 10 is the management of the memory pools 121-125. Increasing the size of a memory pool 121-125 can dramatically reduce response time for accessing storage media data, since there is a higher probability that a copy of the data is cached in memory. This reduction in response time, measured in terms of saved response time per unit memory increase, is referred to as the "response time benefit" (or "benefit").

A benefit reporter and a memory tuner operate to optimize the benefit derived from the system 10. At regularly scheduled intervals (referred to as "sample intervals"), the benefit reporter 130 collects measured output data (e.g., data indicative of system performance metrics) and transmits the data to the memory tuner 140, which is adapted to adjust memory pool allocations, based on analysis of the measured output data, with the intent of reducing overall response time for data access.

Due to the stochastic and dynamic nature of computing systems, the size of these sample intervals can be critical. For example, too small a sample interval may yield an insufficient collection of samples, and significant measurement noise may be generated during optimization, resulting in controller-introduced oscillation. On the other hand, too large a sample interval may reduce the optimization responsiveness as measured by time-response characteristics, such as system settling time. Effective online optimization therefore requires a substantially precise sample interval in order to provide fast response without introducing unwanted oscillation. A drawback of conventional systems for determining sample intervals, such as the benefit reporter and memory tuner system discussed above, is that the determinations tend to be based on static workloads. However, in a dynamic, on-demand environment, the workload characteristics and system configurations change drastically with time, and statically derived intervals may therefore yield less than optimal results.

Thus, there is a need in the art for a method and apparatus for online sample interval determination.

SUMMARY OF THE INVENTION

In one embodiment, the present invention is a system for online determination of sample intervals for dynamic (i.e., non-stationary) workloads. In one embodiment, functional system elements are added to an autonomic manager to enable automatic online sample interval selection. In another embodiment, a method for determining the sample interval by continually characterizing the system workload behavior includes monitoring the system data and analyzing the degree to which the workload is stationary. This makes the online optimization method less sensitive to system noise and capable of being adapted to handle different workloads. The effectiveness of the autonomic optimizer is thereby improved, making it easier to manage a wide range of systems.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention provides a method for online determination of a sample interval for collecting measured output data of computing systems dealing in dynamic (e.g., non-stationary) workloads. In one embodiment, the method is implemented in a data processing system such as that illustrated in FIG. 1, and operates to adjust memory allocation to a plurality of memory pools. Since the total size of a system's memory pools is fixed, increasing the size of one memory pool necessarily means decreasing the size of another pool. Care must be taken in determining when and how frequently to adjust the allocations to the memory pools. If adjustments are made too frequently, the benefit data can be corrupted by substantial random factors in memory usage; however, because, the workload varies over the time and the memory tuner needs to be responsive in determining the optimal memory allocations, memory allocation adjustments must not be made too infrequently either. Determination of proper sample intervals is therefore critical.

Figure 2:
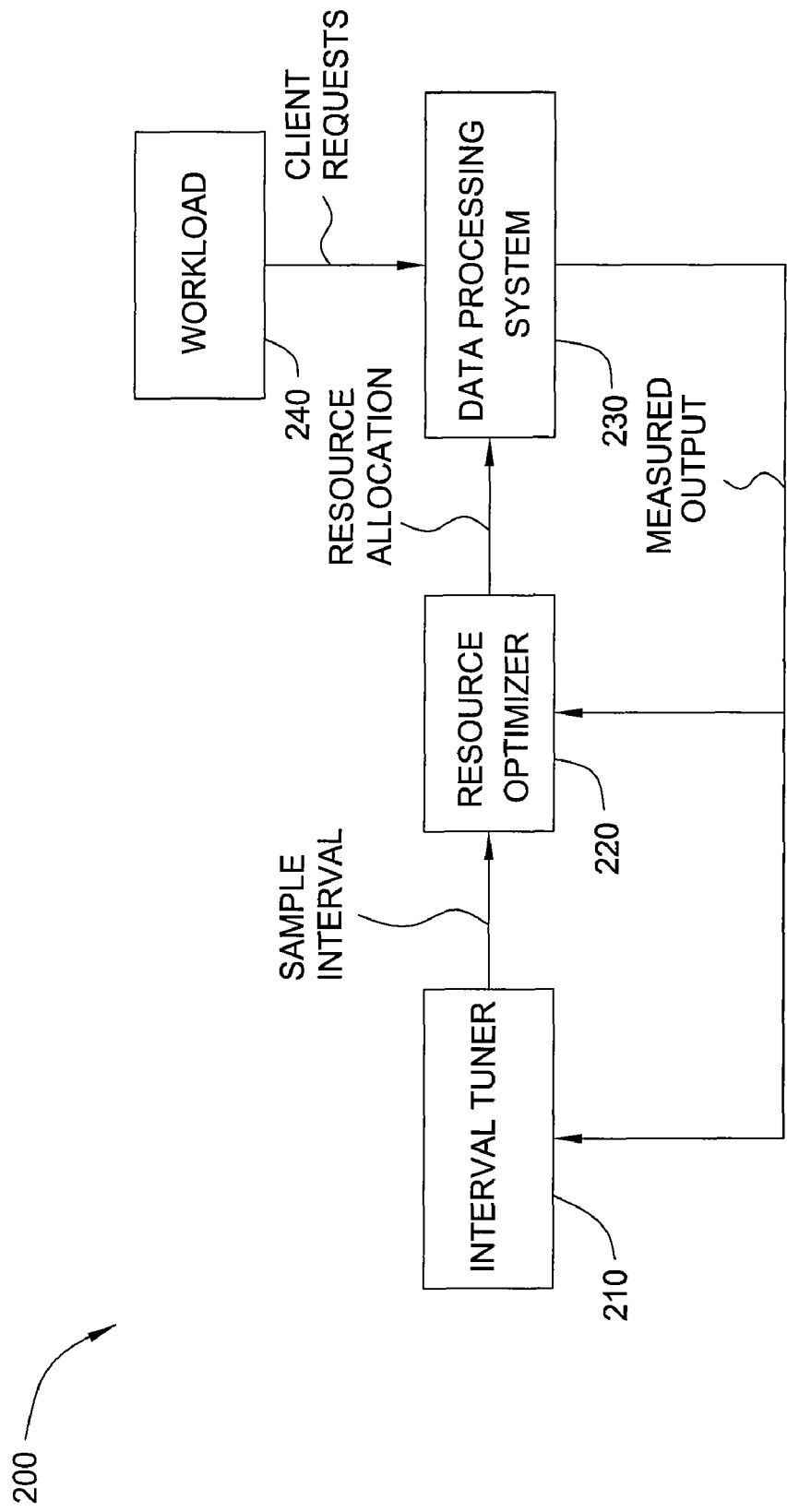
FIG. 2 is a block diagram illustrating the relationship between the interval tuner, the resource optimizer, and the data processing systems according to one embodiment of the present invention.

FIG. 2 is a block diagram illustrating one embodiment of a data processing system 200 in which a method for online determination of a sample interval may be executed according to the present invention. The system 200 comprises an interval tuner 210, a resource optimizer 220, and a data processing system 230. The data processing system 230 receives workload 240 in the form of client requests, and transmits measured output data (in the form of a plurality of data points) to both the resource optimizer 220 and the interval tuner 210. As described above, the measured output data is data indicative of system performance metrics, and in one embodiment, the measured output is benefit information. However, those skilled in the art will appreciate that the measured output data generally reflects many different aspects of the data processing system 200.

Figure 1:
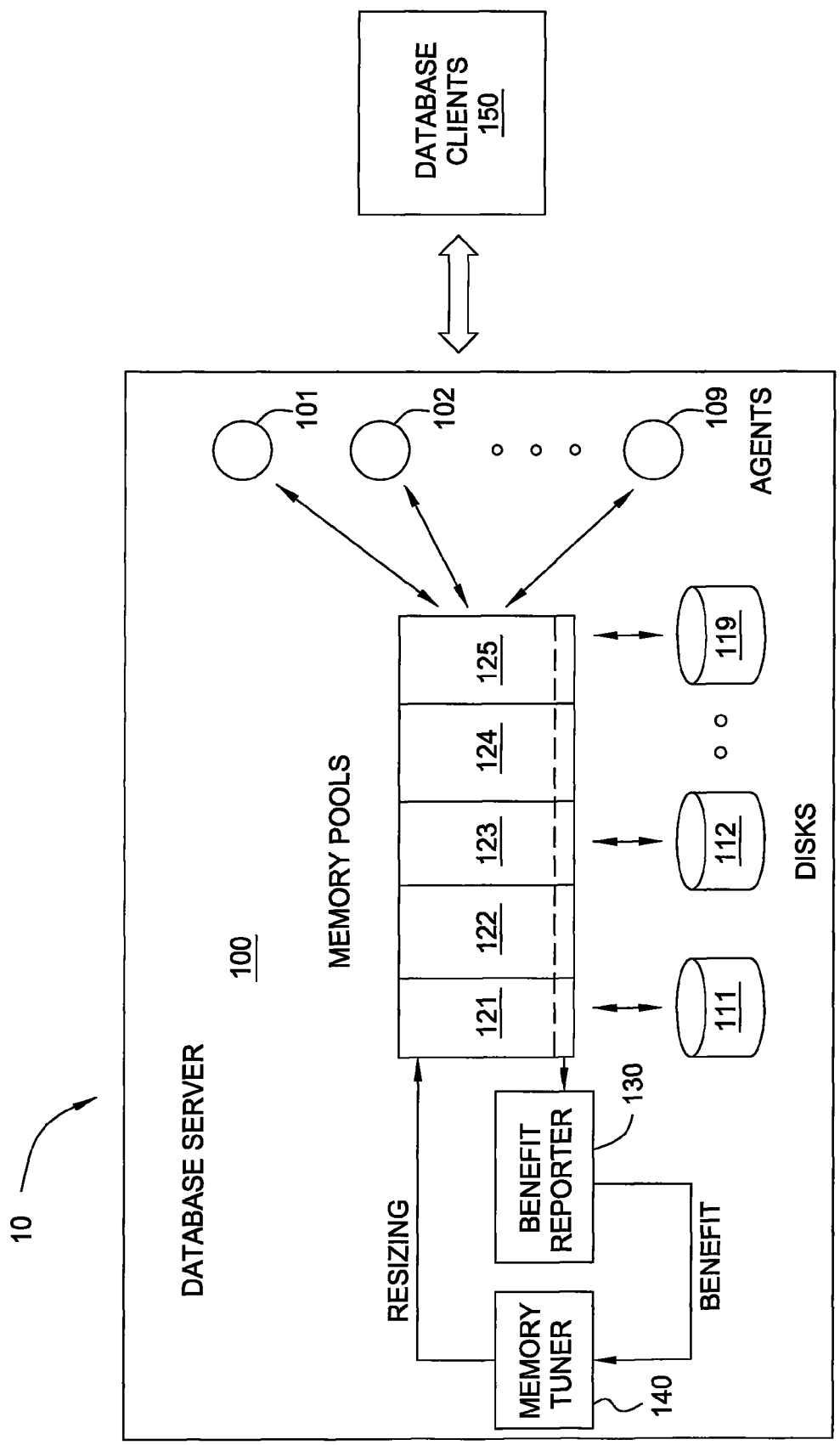
FIG. 1 is a block diagram illustrating a data processing system in which one embodiment of the present invention may be implemented.

The resource optimizer 220 functions in a manner similar to the memory tuner 140 in FIG. 1, and analyzes the measured output data collected from the data processing system 230 to determine new resource allocations for the data processing system at specified intervals of time. The challenge for the resource optimizer is that different workloads 240 will affect the data processing system 230 differently, and will thus require tuning at different intervals. The interval tuner 210 uses the measured output data collected from the data processing system 230 to determine the operating frequency (e.g., the sample interval for collecting the measured output data and the control interval for changing the resource allocation; generally, the sample interval is equal to the control interval) of the resource optimizer 220. The interval tuner 210 is adapted to automatically select and adjust the sample interval in real time.

For example, in one embodiment the workload 240 is an online transaction processing (OLTP) workload. Since each of the transactions take less than a second to run, it may be reasonable for the resource optimizer 220 to tune the resource allocation of the data processing system 230 every one or two minutes (or after several hundred thousand transactions). However, the same resource optimizer 220 and data processing system 230 may need to handle different type of workload 240, such as a decision support (DSS) workload. Since the transactions from a DSS workload usually take several minutes to run (e.g., some transactions can take up to half an hour to run), if the resource optimizer 220 were to tune the data processing system 230 with the same one or two minutes interval, it would be performing intra-query tuning which is much more difficult (and in some cases impossible).

Furthermore, if the data processing system 230 is tuned too quickly, it will cause unnecessary measurement and resizing overheads. Alternatively, if changes are made too infrequently, the system will exhibit poor response time to changing workload demands. The workload characteristics and system configurations in a dynamic on-demand environment differ from customer to customer, and can change drastically during normal operation.

Figure 3:
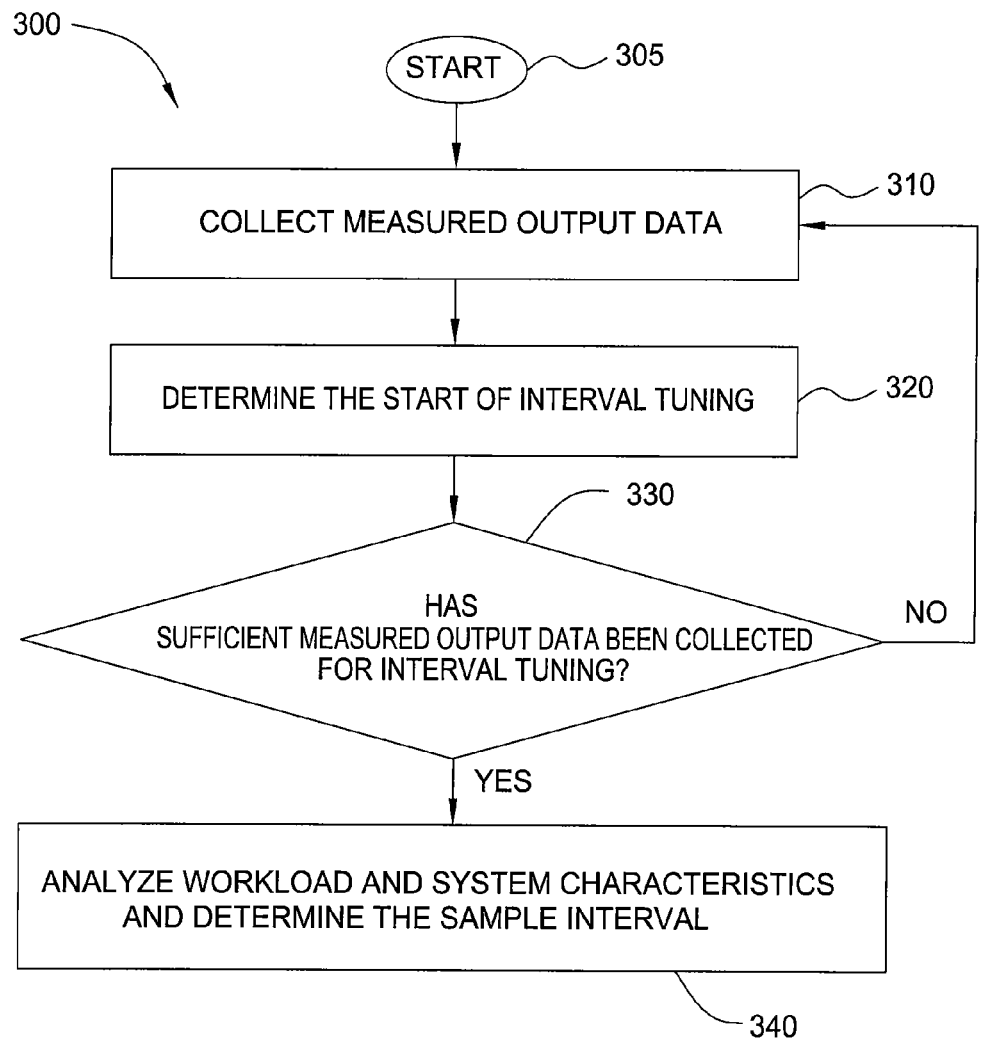
FIG. 3 is a flow diagram illustrating one embodiment of a method for online sample interval determination according to the present invention.

FIG. 3 is a flow diagram illustrating one embodiment of a method 300 for determining sample intervals in a dynamic environment according to the present invention. In one embodiment, the method 300 is executed by the interval tuner 210 of the system 200. The individual steps 310-340 in the method 300 are described in greater details below. The method 300 is initialized at step 305 and proceeds to step 310, where the method 300 collects measured output data. In one embodiment, the measured output data is benefit information.

In step 320, the method 300 uses the measured output data to determine whether to start interval tuning. Once the interval tuning process is started, the resource optimizer (e.g., 220 in FIG. 2) is overridden and current resource allocations are fixed. In step 330, the method 300 determines whether sufficient measured output data has been collected for performing interval tuning. In one embodiment, the collected measured output data is sufficient if it is representative of system characteristics. In one embodiment, the determination of whether sufficient measured output data has been collected is made in accordance with a method 500, described in more detail below with regard to FIG. 5. If the collected measured output data is insufficient for interval tuning, the method 300 returns to step 310 and collects additional data. Alternatively, if the method 300 determines in step 330 that sufficient measured output data has been collected, the method 300 proceeds to step 340, where the method 300 analyzes the system workload and characteristics, as indicated by the collected measured output data, and determines a sample interval that is suitable for the system 200 and workload 240.

The method 300 continually characterizes the workload behavior and statistically determines the sample interval based on the collected measured output data. This allows the resource optimizer 220 to be less sensitive to system noise and to adapt to different workloads 240, since interval tuning is conducted regularly during the period in which automatic resource allocation is active for the data processing system 200.

Figure 4:
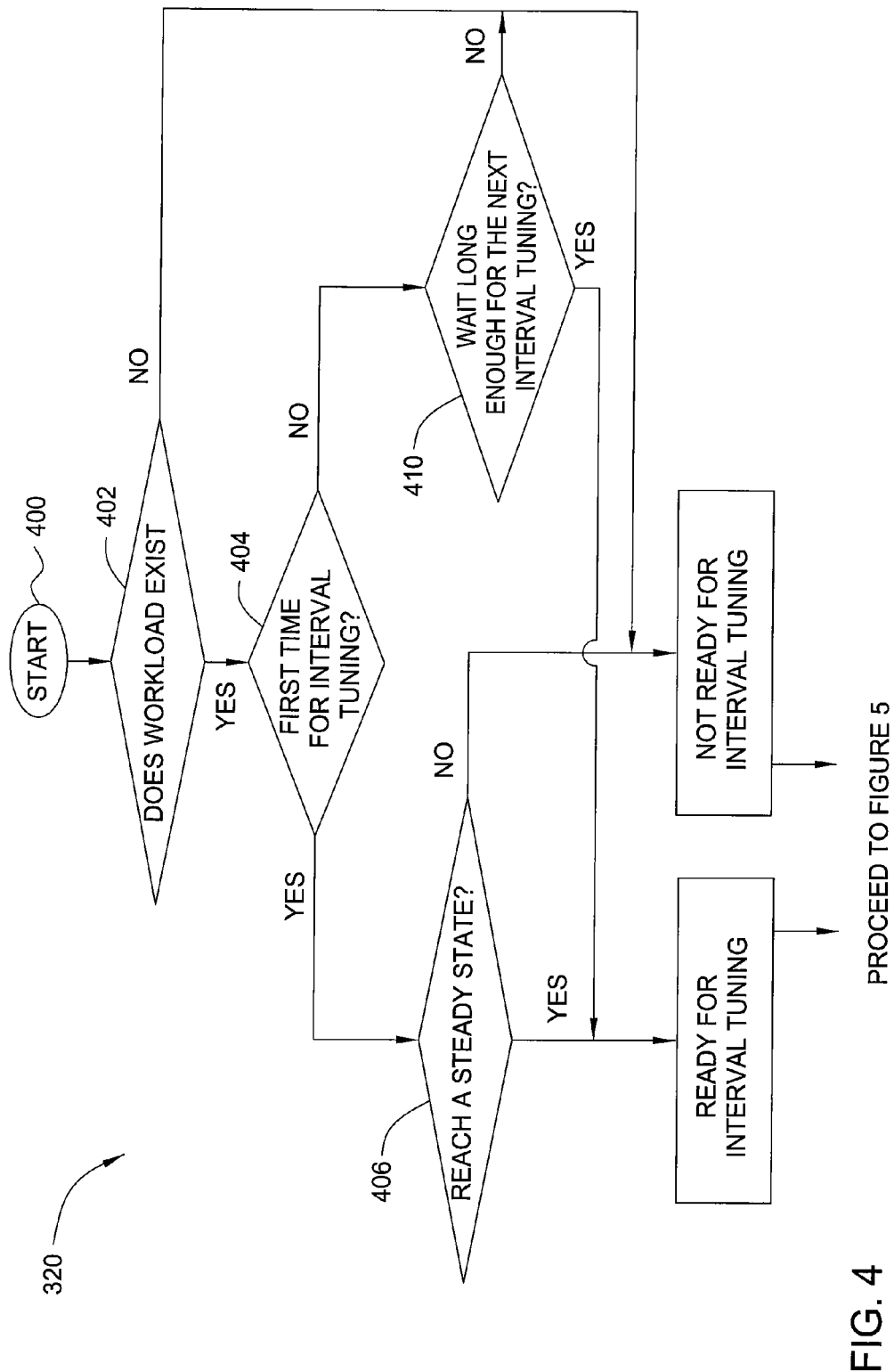
FIG. 4 is a flow diagram illustrating one embodiment of a method for determining when to start interval tuning according to the present invention.

FIG. 4 is a flow diagram illustrating one embodiment of a method 320 for determining whether to start interval tuning. The method 320 is initialized at step 400 and proceeds to step 402, where the method 320 determines whether a system workload 240 exists. Since a workload 240 must exist (e.g., at least one of the measured output data must be non-zero) in order for interval tuning to begin, if the method 320 determines at step 402 that a workload 240 does not exist, the method 320 concludes that the system 200 is not ready for interval tuning. Alternatively, if a workload 240 does exist, the method 320 proceeds to step 404, where the method 320 determines whether the system 200 is attempting to start interval tuning for the first time. Those skilled in the art will appreciate that at a particular time interval, some of the data points of the measured output data can be zero; for example, one or more databases may not be needed by the database agents for handling the client requests. However, in one embodiment, if all of the data are zero, the workload 240 most likely does not exist, e.g., the data processing system 200 is not connected to handle incoming workloads 240. Since the workload 240 does not exist, the interval tuning process should not be started.

If the system 200 has completed interval tuning for the first time, since the workload may change over time, the system 200 may attempt to perform interval tuning again. Therefore, the method 320 proceeds to step 410 and waits for the next scheduled interval tuning.

If the system 200 is attempting to perform interval tuning for the first time, the method 320 proceeds to step 406 to determine whether the system resource allocation has reached a steady state. In one embodiment, a steady state implies that the system 200 is working in a normal operating state, so that the measured output (benefit) data collected is representative of system characteristics and so that interval tuning is necessary.

Figure 7:
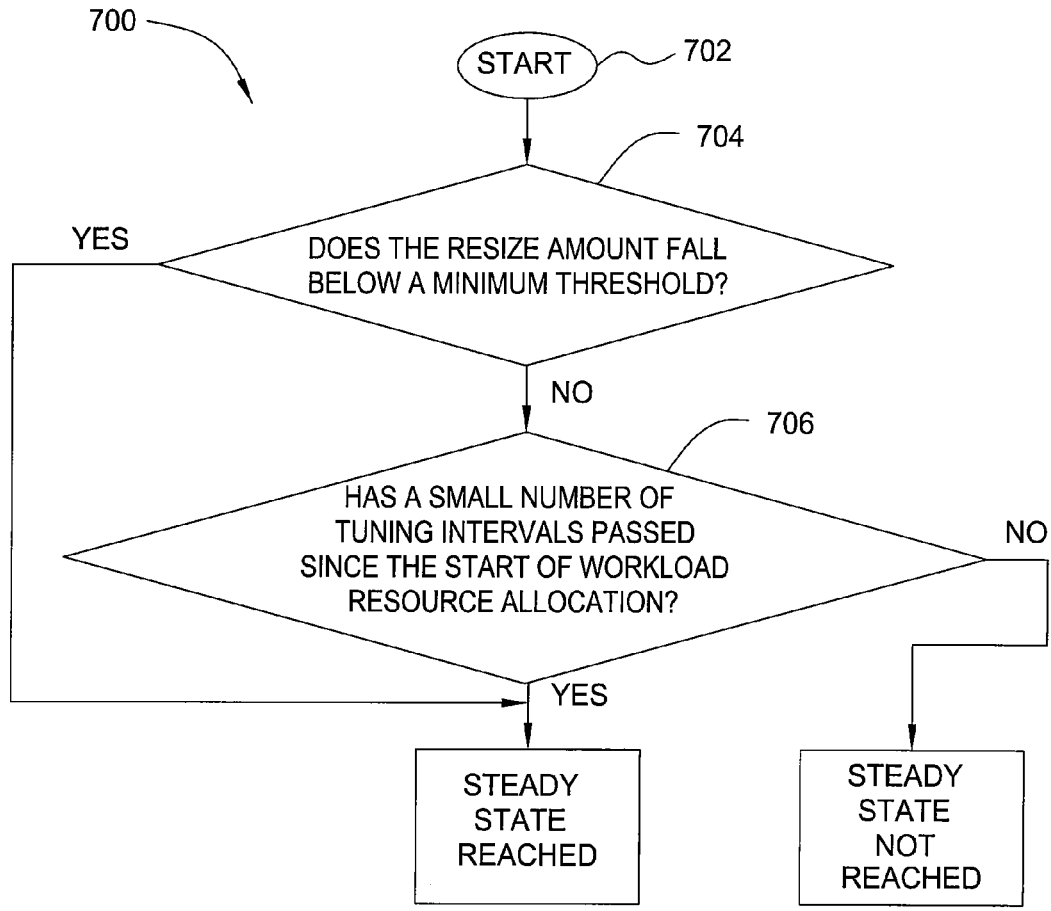
FIG. 7 is a flow diagram illustrating one embodiment of a method for determining whether a system resource allocation has reached a steady state according to the present invention.

FIG. 7 is a flow diagram illustrating one embodiment of a method 700 for determining whether the system 200 has reached a steady state. The method 700 is initialized at step 702 and proceeds to step 704, where the method 700 determines whether the resize amount falls below some minimum threshold, thereby implying that the system 200 has converged and the system resource is not aggressively reallocated by the resource optimizer 220 (that is, a steady state is reached). In one embodiment, the system resource is memory, and the resize amount is the percentage of memory reallocation with respect to the total available memory. If the resize amount is insignificant (e.g., below a threshold of 0.5%), the system is assumed to have converged since less than 0.5% memory reallocation will not significantly impact system performance. If the method 700 determines that the resize amount does fall below the minimum threshold, the method 700 determines that the steady state has been reached or is close to being reached. Alternatively, if the method 700 determines that the resize amount does not fall below the minimum threshold, the method 700 proceeds to step 706.

In step 706, the method 700 determines whether a relatively small number of tuning intervals has passed since the start of workload 240 and resource allocation from the resource optimizer 220, thereby implying that convergence of the system 200 may not be possible with the current sample interval. In one embodiment, this "relatively small number" of tuning intervals is based upon the desired converging speed of the resource optimizer. In one embodiment, it is desirable for the resource optimizer to converge at approximately twenty intervals. If the method 700 determines that a relatively small number of tuning intervals has passed, the method 700 determines that the system 200 has reached a steady state, e.g., a normal operating state where the system 200 can oscillate and not necessarily need to be converged. That is, the data collected at the steady state is representative of system characteristics and may be used for interval tuning purposes.

Figure 5:
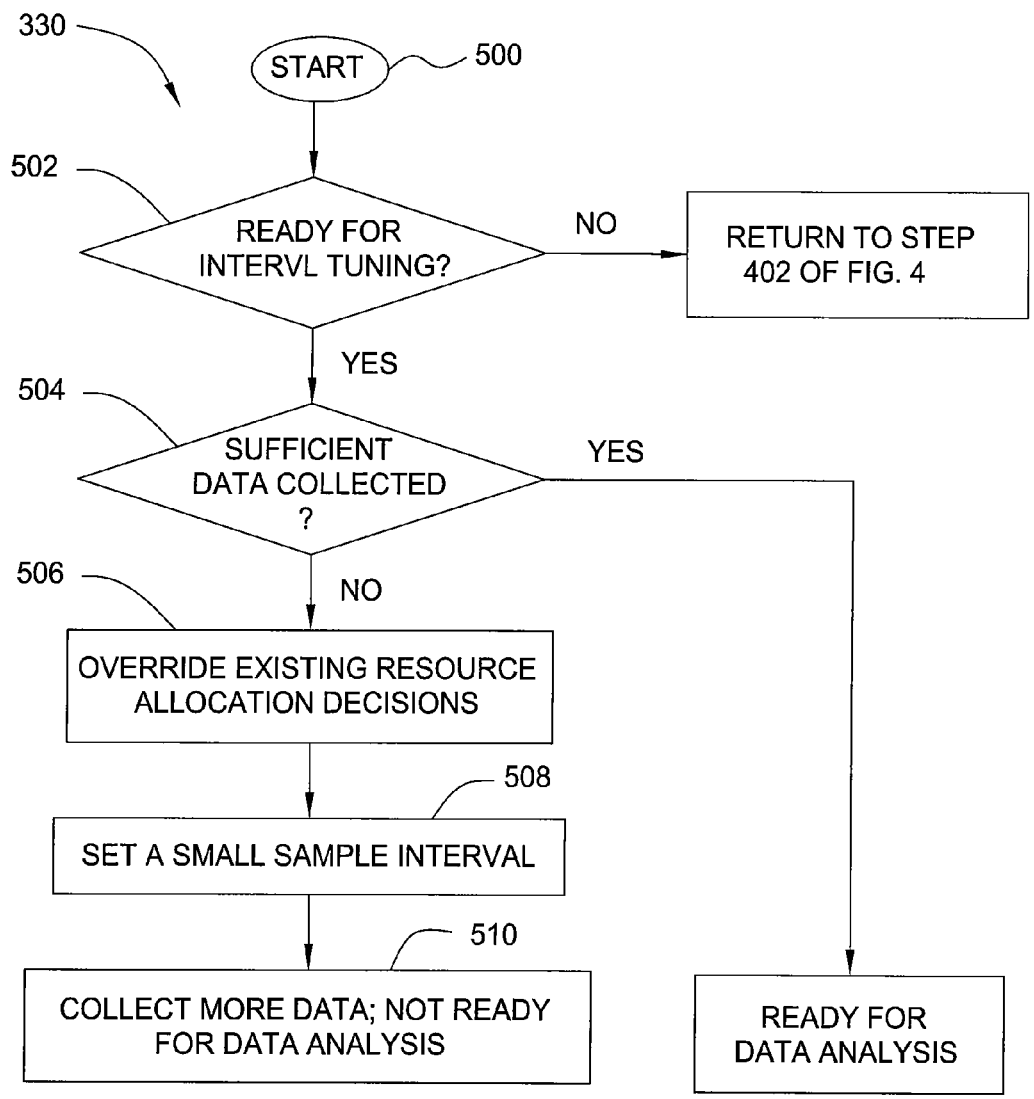
FIG. 5 is a flow diagram illustrating one embodiment of a method for specifying modeling data that is suitable for interval tuning according to the present invention.

Thus, referring back to FIG. 4, if the method 700 indicates that the system resource allocation has reached the steady state, the method 320 determines that the system is ready for interval tuning and proceeds to step 330 of FIG. 3 (illustrated in further detail in FIG. 5). Alternatively, if the method 700 determines that the system 200 has not reached a steady state, interval tuning should not be started.

FIG. 5 is a flow diagram illustrating one embodiment of a method 330 for determining whether sufficient measured output data has been collected for interval tuning. The method 330 is initialized at step 500 and proceeds to step 502, where the method 500 determines whether the system 200 is ready for interval tuning (e.g., based on the results obtained by the method 320 of FIG. 4). If the method 330 determines that the system 200 is not ready for interval tuning, the method 330 returns to step 402 of FIG. 4 and repeats the method 320. If the method 330 determines that the system 200 is ready for interval tuning, the method 330 proceeds to step 504 to determine whether enough measured output data has been collected to perform interval tuning. If the method 330 determines that sufficient data has been collected, the method 330 determines that the system 200 is ready for analysis of the measured output data, and proceeds to step 340 of FIG. 3 (illustrated in further detail in FIG. 6).

Alternatively, if the method 330 determines that sufficient data has not been collected, the method 330 proceeds to step 506, where the method 330 overrides any resource allocation decisions from the resource optimizer. In one embodiment, no resource reallocation is conducted while measured output data is collected for analysis (e.g., in step 340 of the method 300), thereby ensuring that the system 200 is able to base data analysis on a stable data set. This helps to remove autocorrelation of the measured output data due to closed loop tuning. Next, the method 330 proceeds to step 508, where a small sample interval is set.

In one embodiment, a small sample interval size is used in order to shorten the data collection process, but still collect enough data points for analysis. In one embodiment, this "small" sample interval size is the minimum sample interval that can be reasonably applied in the data processing system. For example, a data processing system handling a combination of online transaction processing (OLTP) and decision support system (DSS) workloads (e.g., transactions that may take less than a second or more than an hour) may select a minimum sample interval between five and thirty seconds. In one embodiment, this minimum sample interval is large enough to include dozens of transactions, but not too small in light of the resizing time and central processing unit cycles. The method 330 then collects more measured output data in step 510 using this sample interval, and proceeds to step 340 of FIG. 3 (illustrated in further detail in FIG. 6).

Figure 6:
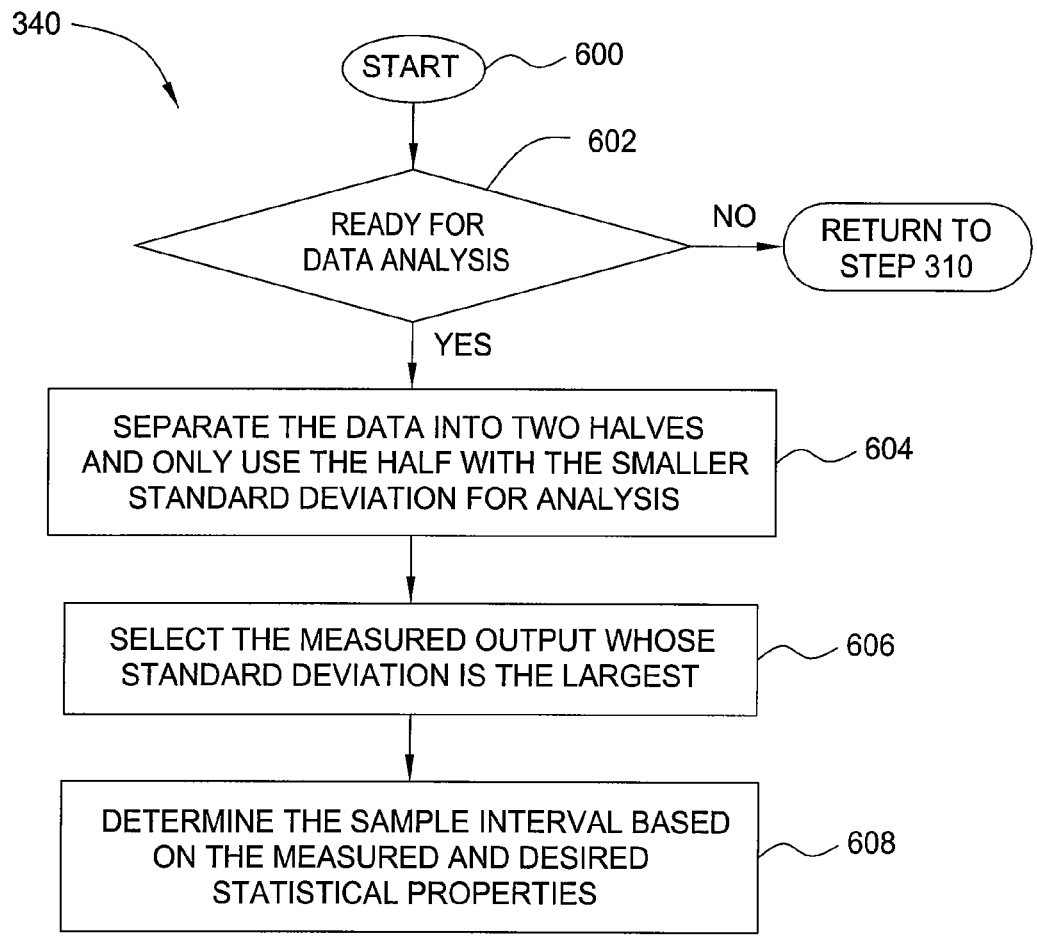
FIG. 6 is a flow diagram illustrating one embodiment of a method for analyzing workload and system characteristics and determining the sample interval according to the present invention.

FIG. 6 is a flow diagram illustrating one embodiment of a method 340 for analyzing the workload and system characteristics and determining the sample interval. The method 340 is initialized at step 600 and proceeds to step 602, where the method 340 determines whether the system 200 is ready for analysis of the collected measured output data. If the system 200 is not ready for data analysis, the method 340 returns to step 310 of FIG. 3, to repeat the method 300. If the method 340 determines that the system 200 is ready for data analysis, the method 340 proceeds to step 604, where the method 340 separates the "good" collected measured output data from the data that may have been affected by an abrupt workload change. To accomplish this separation, the method 340 separates the collected data into two groups (e.g., halves) and only analyzes the group with the smaller standard deviation. The method 340 then proceeds to step 606, where, if the method 340 determines that the data processing system 200 reports more than one measured output data point for the purpose of resource optimization, the method 340 selects the measured output data group whose standard deviation is the largest, for performing interval tuning.

In step 608, the method 340 determines the sample interval based on the measured and desired statistical properties of the system 200. In one embodiment, the sample interval is determined by considering the confidence of the measured output data. For example, given P measured benefit samples from a database server, which are represented by benefit (i) for i=1, 2, ..., P, the sample mean is:

$$\text{mean benefit} = \frac{[\text{benefit}(1) + \text{benefit}(2) + \ldots + \text{benefit}(P)]}{P} \quad \text{(EQN. 1)}$$

and the sample standard deviation is $$\text{std benefit} = \sqrt{\frac{\{[\text{benefit}(1) - \text{mean benefit}]2 + \ldots + [\text{benefit}(P) - \text{mean benefit}]2\}}{P - 1}} \quad \text{(EQN. 2)}$$

Both the mean benefit and the std benefit values are used to calculate the interval size as follows:

$$\text{desired sample interval} = \left[T\left(\frac{std \text{ benefit}}{\text{desired confidence range}}\right)\right]^2 (\text{current sample interval}) \quad (\text{EQN. 3})$$

where "desired confidence range" is an accuracy measure of the desired maximum difference between the measured sample benefit and the statistically "real" mean benefit, and "current sample interval" is the sample interval that is currently used to collect benefit data (e.g., benefits 1-P). In one embodiment, the desired confidence range is plus or minus 10% of the measured sample benefit. In another embodiment, the desired confidence range is plus or minus 20% of the measured sample benefit. In one embodiment, the benefit data is noisy but the accuracy requirement is high, resulting in a large desired sample interval. Note that the random variable (benefit−mean benefit)/(std benefit) follows the student distribution, which is different to the normal distribution because mean benefit and std benefit are estimated. The constant T is used to compensate for the estimated benefits. Those skilled in the art will appreciate that more details on student and normal distributions can be found in most statistics textbooks, including Walpole et al., Probability and Statistics for Engineers and Scientists, Prentice Hall, 1997.

For convenience, a subset of a table for determining T is illustrated in Table I.

TABLE I

Subset of table for determining T

| | 1 | 2 | 3 | 4 | 5 |
|---|---|---|---|---|---|
| 0.9 | | | | | |
| 0.95 | 12.706 | 4.303 | 3.182 | 2.776 | 2.571 |
| 0.9 | 6.314 | 2.92 | 2.353 | 2.132 | 2.015 |
| 0.8 | 3.078 | 1.1886 | 1.638 | 1.533 | 1.476 |

In Table I, each row corresponds to one confidence interval (0.95, 0.0, 0.8, etc.) and each column corresponds to a degree of freedom (1, 2, 3, 4, 5, etc.), e.g., the number of measured benefit samples. For example, if 90% confidence in the accuracy of the measured data is desired, and the decision is based on P=3 measured benefit samples, a T of 2.353 is chosen. Increasing the confidence (e.g., from 90% to 95%) will result in a larger value for T; in addition, achieving a greater confidence score will require a larger sample interval. Decreasing the number of measured benefit samples (e.g., from three to two) will also result in a larger value for T, indicating that a larger sample interval is required. This is because a sample interval size that is determined based on a smaller sample is subject to more errors; to achieve the same confidence level, a larger desired sample interval would be required.

Figure 8:
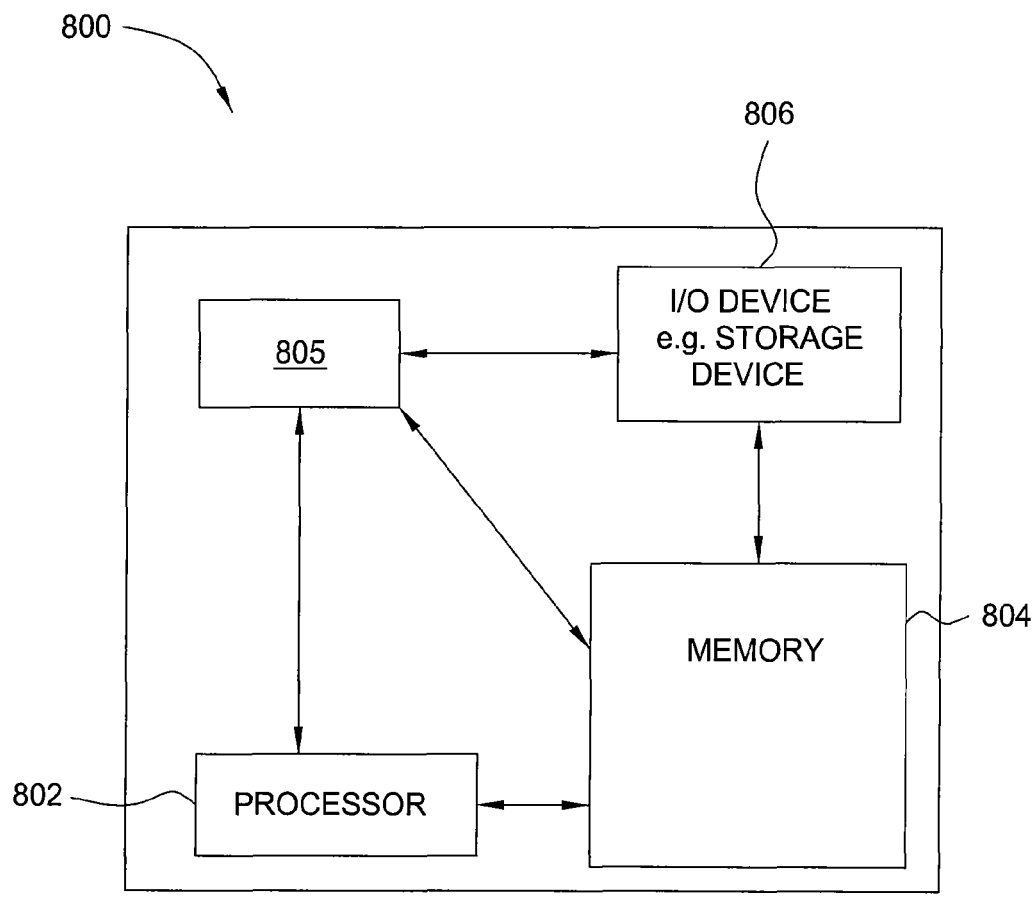
FIG. 8 is a high level block diagram of the present invention implemented using a general purpose computing device.

FIG. 8 is a high level block diagram of the present dynamic resource allocation system that is implemented using a general purpose computing device 800. In one embodiment, a general purpose computing device 800 comprises a processor 802, a memory 804, a dynamic resource optimizer or module 805 (e.g., capable of performing online sample interval determination) and various input/output (I/O) devices 806 such as a display, a keyboard, a mouse, a modem, and the like. In one embodiment, at least one I/O device is a storage device (e.g., a disk drive, an optical disk drive, a floppy disk drive). It should be understood that the dynamic resource optimizer 805 can be implemented as a physical device or subsystem that is coupled to a processor through a communication channel.

Alternatively, the dynamic resource optimizer 805 can be represented by one or more software applications (or even a combination of software and hardware, e.g., using Application Specific Integrated Circuits (ASIC)), where the software is loaded from a storage medium (e.g., I/O devices 806) and operated by the processor 802 in the memory 804 of the general purpose computing device 800. Thus, in one embodiment, the resource optimizer 805 for allocating resources among entities described herein with reference to the preceding Figures can be stored on a computer readable medium or carrier (e.g., RAM, magnetic or optical drive or diskette, and the like).

In further embodiments, resources may be shared among a plurality of clients, e.g., web content providers, and dynamic resource allocation and optimization may be provided to the clients according to the methods of the present invention. In such cases, the workload of each individual client may be continually monitored so that resources allocated to any individual client are sufficient to meet, but do not greatly exceed, the needs of the client, thereby substantially achieving optimal resource allocation.

Thus, the present invention represents a significant advancement in the field of dynamic resource allocation. A method and apparatus are provided that enable a data processing system to dynamically determine a sample interval for analyzing resource allocation by continually characterizing the system workload. This makes the online optimization method less sensitive to system noise and capable of being adapted to handle different workloads. The effectiveness of a system resource optimizer is thereby improved, making it easier to manage a wide range of systems.

While foregoing is directed to the preferred embodiment of the present invention, other and further embodiments of the invention may be devised without departing from the basic scope thereof, and the scope thereof is determined by the claims that follow.

The invention claimed is:

1. A method for determining sample intervals for resource allocations in a dynamic computing system, the method comprising the steps of:
   collecting measured output data indicative of a performance of said dynamic computing system and of variable workloads of said dynamic computing system;
   determining whether to start interval tuning of the dynamic computing system by determining when the dynamic computing system is receiving a workload, wherein the dynamic computing system is not ready to start interval tuning when the dynamic computing system is not receiving the workload; and
   analyzing the measured output data to determine a sample interval for the dynamic computing system, wherein analyzing comprises:
      separating the measured output data into a first group and a second group, wherein said first group has a smaller standard deviation within the first group relative to said second group;
      selecting the second group; and
      determining the sample interval based in part on a desired confidence range, wherein the desired confidence range is an accuracy of a desired maximum difference between a measured sample benefit reflected in said measured output data in said second , group and a statistically real mean benefit.

2. The method of claim 1, wherein said determining step whether to start interval tuning comprises:

determining whether sufficient measured output data has been collected for interval tuning, prior to starting said analyzing.

3. The method of claim 2, wherein additional measured output data is collected when the collected measured output data is not sufficient.

4. The method of claim 1, wherein the measured output data is benefit indicative of system a response time of said dynamic computing system as a function of system resource allocations of said dynamic computing system.

5. The method of claim 1, wherein the measured output data is collected for a fixed number of intervals.

6. The method of claim 1, wherein resource re-allocation is halted during the collecting.

7. The method of claim 1, further comprising: determining if the dynamic computing system is attempting to perform interval tuning for a first time, when the dynamic computing system is receiving a workload.

8. The method of claim 7, further comprising: determining if the dynamic computing system has reached a steady state, when the dynamic computing system is attempting to perform interval tuning for first time.

9. The method of claim 7, further comprising: waiting for a next-scheduled tuning interval, when the dynamic computing system is not attempting to perform interval tuning for a first time.

10. The method of claim 8, wherein the dynamic computing system is ready for interval tuning only when the dynamic computing system has reached a steady state.

11. The method of claim 9, wherein the dynamic computing system is ready for interval tuning during a next-scheduled tuning interval.

12. The method of claim 7, wherein the dynamic computing system is presumed to be receiving a workload when at least one data point of the collected measured output data is not zero.

13. The method of claim 8, wherein the dynamic computing system has reached a steady state when data collected at a current state is representative of characteristics of the dynamic computing system.

14. The method of claim 2, wherein the dynamic computing system is ready for the analyzing when sufficient measured output data has been collected.

15. The method of claim 2, comprising: overriding a current resource allocation of the dynamic computing system, when sufficient measured output data has not been collected; setting a small sample interval; and collecting additional measured output data.

16. A non-transitory computer readable medium containing an executable program for determining sample intervals for resource allocations in a dynamic computing system, wherein the program performs the steps of:
collecting measured output data indicative of a performance of said dynamic computing system and of variable workloads of said dynamic computing system;
determining whether to start interval tuning of the dynamic computing system by determining when the dynamic computing system is receiving a workload, wherein the dynamic computing system is not ready to start interval tuning when the dynamic computing system is not receiving the workload; and
analyzing the measured output data to determine a sample interval for the dynamic computing system, wherein analyzing comprises:
separating the measured output data into a first group and a second group, wherein said first group has a smaller standard deviation within the first group relative to said second group;
selecting the second group; and
determining the sample interval based in part on a desired confidence range, wherein the desired confidence range is an accuracy of a desired maximum difference between a measured sample benefit reflected in said measured output data in said second group and a statistically real mean benefit.

17. The non-transitory computer readable medium of claim 16, wherein said determining step whether to start interval tuning comprises:
determining whether sufficient measured output data has been collected for interval tuning, prior to starting said analyzing.

18. The non-transitory computer readable medium of claim 16, wherein the measured output data is benefit indicative of a response time of said dynamic computing system as a function of resource allocations of said dynamic computing system.

19. The non-transitory computer readable medium of claim 16, wherein the measured output data is collected for a fixed number of intervals.

20. The non-transitory computer readable medium of claim 16, wherein resource re-allocation is halted during the collecting.

21. The non-transitory computer readable medium of claim 16, further comprising:
determining if the dynamic computing system is attempting to perform interval tuning for a first time, when the dynamic computing system is receiving a workload.

22. The non-transitory computer readable medium of claim 21, further comprising:
determining if the dynamic computing system has reached a steady state, when the dynamic computing system is attempting to perform interval tuning for a first time.

23. The non-transitory computer readable medium of claim 21, further comprising:
waiting for a next-scheduled tuning interval, when the dynamic computing system is not attempting to perform interval tuning for a first time.

24. The non-transitory computer readable medium of claim 22, wherein the dynamic computing system is ready for interval tuning only when the dynamic computing system has reached a steady state.

25. The non-transitory computer readable medium of claim 23, wherein the dynamic computing system is ready for interval tuning during a next-scheduled tuning interval.

26. The non-transitory computer readable medium of claim 21, wherein the dynamic computing system is presumed to be receiving a workload when at least one data point of the collected measured output data is not zero.

27. The non-transitory computer readable medium of claim 22, wherein the dynamic computing system has reached a steady state when data collected at a current state is representative of characteristics of the dynamic computing system and suitable for use in interval tuning.

28. The non-transitory computer readable medium of claim 17, wherein the dynamic computing system is ready for the analyzing when sufficient measured output data has been collected.

29. The non-transitory computer readable medium of claim 17, comprising:
overriding a current system resource allocation of the dynamic computing system, when sufficient measured output data has not been collected; setting a small sample interval; and collecting additional measured output data.

30. A method for providing an optimization service to a client for a data processing system receiving a variable workload, the method comprising steps of:
collecting measured output data indicative of a performance of said data processing system and of variable workloads of said data processing system;
determining whether to start interval tuning of the data processing system by determining when the data processing system is receiving a workload;
determining if the data processing system is attempting to perform interval tuning for a first time, when the data processing system is receiving the workload; and
analyzing the measured output data to determine a sample interval for the data processing system, wherein analyzing comprises:
separating the measured output data into a first group and a second group, wherein said first group has a smaller standard deviation within the first group relative to said second group;
selecting the second group; and determining the sample interval based in part on a desired confidence range, wherein the desired confidence range is an accuracy of a desired maximum difference between a measured sample benefit reflected in said measured output data in said second group and a statistically real mean benefit.

31. The method of claim 30, wherein said determining step whether to start interval tuning comprises:
determining whether sufficient measured output data has been collected for interval tuning, prior to the start of measured output data analysis starting said analyzing.

32. The method of claim 30, wherein the measured output data is benefit indicative of system a response time of said data processing system as a function of system resource allocations of said data processing system.

33. The method of claim 30, further comprising: determining if the data processing system has reached a steady state, when the data processing system is attempting to perform interval tuning for the first time.

34. The method of claim 30, further comprising: waiting for a next-scheduled tuning interval, when the data processing system is not attempting to perform interval tuning for the first time.

35. The method of claim 33, wherein the data processing system is ready for interval tuning only when the data processing system has reached a steady state.

36. The method of claim 33, wherein the data processing system has reached a steady state when data collected at a current state is representative of characteristics of the data processing system and suitable for use in interval tuning.

37. The method of claim 31, wherein the data processing system is ready for the analyzing when sufficient measured output data has been collected.

38. The method of claim 31, wherein the method further comprises the following steps if sufficient measured output data has not been collected further comprising:
overriding a current resource allocation of the data processing system, when sufficient measured output data has not been collected; setting a small sample interval; and collecting additional measured output data.

39. A computing system, comprising:
a processor configured to receive and process a variable workload, wherein the processor is further adapted to generate measured output data indicative of processing system processor indicative of a performance of said processor and of variable workloads of said processor;
a plurality of resources available to the processor for processing the variable workload;
a resource optimizer coupled to the processor and adapted for evaluating resource allocations in pre-defined intervals; and
an interval tuner coupled to the processor and to the resource optimizer, the interval tuner being adapted for determining whether to start interval tuning of the computing system by determining when the computing system is receiving the variable workload, wherein the computing system is not ready to start interval tuning when the computing system is not receiving the variable workload, and wherein the interval tuner is further adapted for evaluating the measured output data in order to determine the pre-defined intervals in which the resource optimizer evaluates resource allocations by:
separating the measured output data into a first group and a second group, wherein said first group has a smaller standard deviation within the first group relative to said second group;
selecting the second group; and
determining the pre-defined intervals based in part on a desired confidence range wherein the desired confidence range is an accuracy of a desired maximum difference between a measured sample benefit reflected in said measured output data in said second group and a statistically real mean benefit.

* * * * *